March 23, 1943. D. D. ORMSBY 2,314,511
MOTOR VEHICLE
Filed Aug. 14, 1940 2 Sheets-Sheet 1
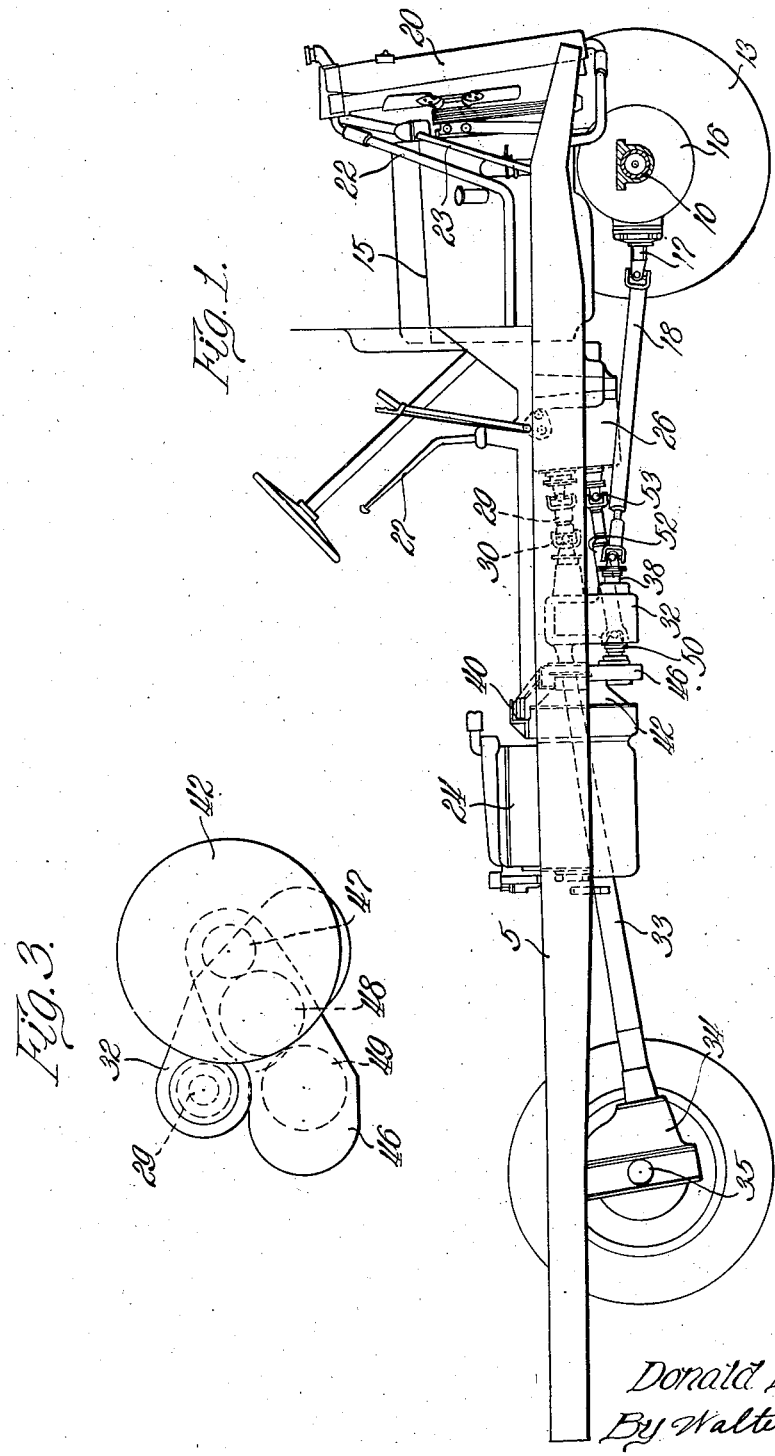
Inventor:
Donald D. Ormsby
By Walter E. Schirmer
Atty.

March 23, 1943.  D. D. ORMSBY  2,314,511
MOTOR VEHICLE
Filed Aug. 14, 1940  2 Sheets-Sheet 2
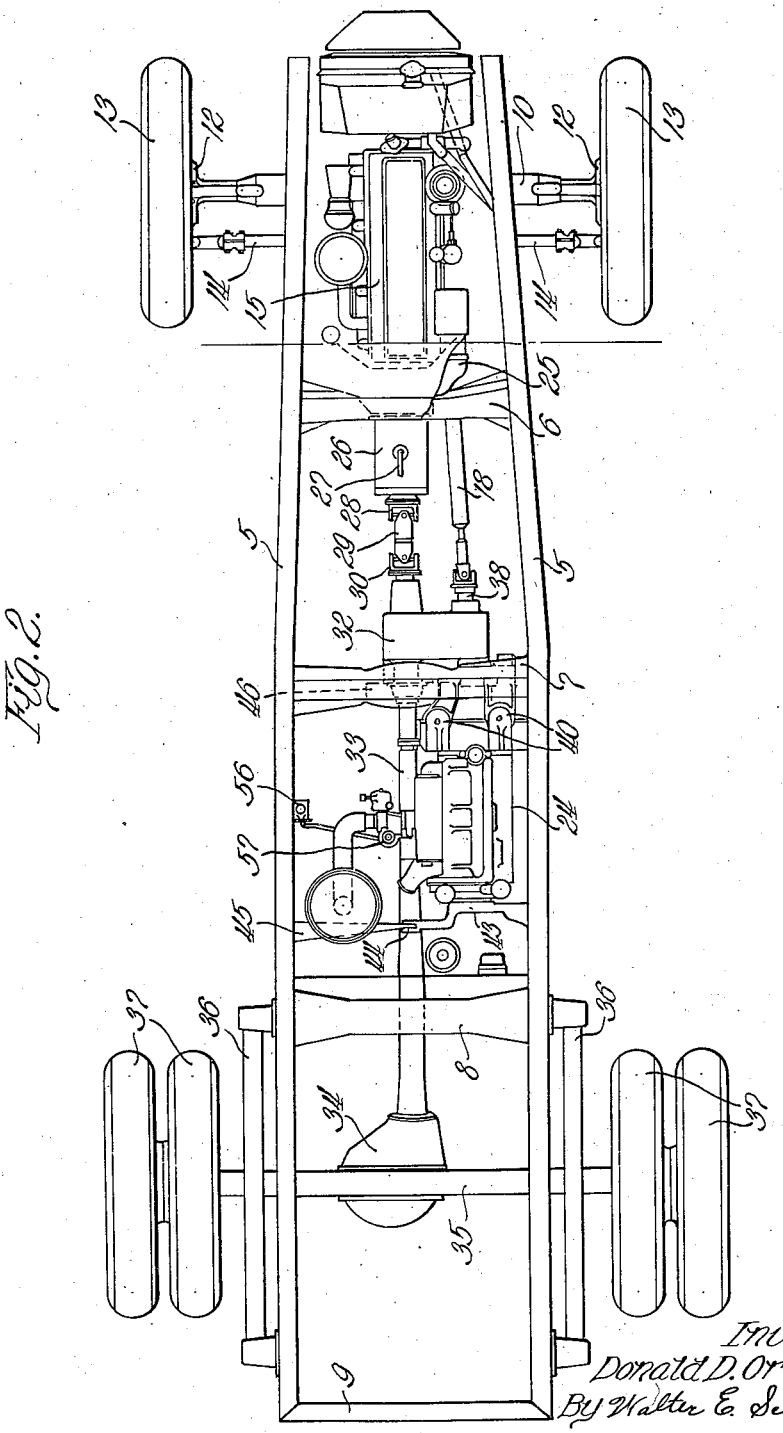
Inventor:
Donald D. Ormsby
By Walter E. Schirmer
Atty.

Patented Mar. 23, 1943

2,314,511

UNITED STATES PATENT OFFICE 2,314,511

MOTOR VEHICLE

Donald D. Ormsby, Buchanan, Mich., assignor to Clark Equipment Company, Buchanan, Mich., a corporation of Michigan Application August 14, 1940, Serial No. 352,497

12 Claims. (Cl. 180—54)

This invention relates to motor vehicles, and is more particularly directed to a motor vehicle of the four-wheel drive type in which both the front and rear axles are adapted to drive the vehicle. I have developed in connection with such a four-wheel drive construction a novel type of booster engine assembly for supplementing the torque of the main engine of the vehicle under predetermined conditions.

The present invention therefore contemplates the provision of a booster engine construction similar to that described in my copending application, Serial No. 256,947, filed February 17, 1939, but rearranged and redesigned so as to be applicable to a four-wheel drive vehicle in which its utility and value greatly enhances the power and speed available in the vehicle.

One of the primary advantages secured by the present construction is the provision of a design requiring no change in the normal driving arrangement of a four-wheel drive vehicle or in the transfer case thereof which will allow the application of the booster engine to vehicles of this type now in use, and which will allow interchangeability between new and used vehicles.

Still another advantage provided by the present construction is the provision of means for supplementing the torque of the main engine under predetermined conditions in order to further increase the power available in the vehicle. This is of special interest in that such vehicles are employed in travelling over rough terrain or cross country, and in climbing hills or the like additional power is readily available to supply increased torque to the driving axles.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a side elevational view of a vehicle chassis embodying the present invention;

Figure 2 is a top plan view of the chassis shown in Figure 1; and

Figure 3 is a somewhat diagrammatic view in elevation showing the inter-relation between the transfer case and the booster engine connecting gearing.

Referring now in detail to the drawings, the vehicle chassis comprises side rails 5 which are joined together at suitable intervals by means of cross members 6, 7, 8 and 9. The forward end of the chassis is adapted to be mounted upon a driving axle 10 which, at oppoiste ends, is provided with dirigibly mounted driving spindles 12 supporting the wheels 13. The wheels 13 are tied together for steering movement by means of the tie rod 14. Disposed in a laterally offset position with respect to the main engine 15 of the vehicle is a differential housing 16 formed in the front axle housing 10 which is provided with a rearwardly extending pinion shaft 17 to which is connected the propeller driving shaft 18. The offset of the portion 16 of the housing is to provide for clearance between the engine and the differential when the vehicle chassis moves relative to the axle. Mounted forwardly of the main engine 15 of the vehicle is the radiator 20 and the various connections incident to a vehicle of this type, including hose connections 22 and 23 which are adapted to be connected to the inlet and outlet respectively of the cooling system of the booster engine 24.

Secured to the bell housing 25 of the main engine 15 is a transmission 26 having a main shaft and a countershaft, and provided with the usual gear shift lever 27. The rear end of the main shaft of the transmission 26 is connected through a universal joint 28 to a short propeller shaft 29 which in turn, through joint 30, is connected into a transfer case 32 supported from a cross frame 7 and extending downwardly and laterally, as indicated generally in Figure 3. From the transfer case 32, torque from the transmission 26 is transmitted through the propeller shaft 33, to the differential housing 34 and the rear axle 35 which supports the rear end of the chassis by means of the springs 36. Opposite ends of the housing 35 are provided with driving wheels 37, which may be either single or dual wheels.

At the lower end of the transfer case 32 there is provided a forwardly extending shaft 38 which drives the propeller shaft 18 connected to the forward driving axle. It will be noted that this drive is disposed below and laterally offset with respect to the main drive from the transmission through the transfer case to the rear axle.

Mounted adjacent one of the side rails 5 rearwardly of the cross member 7 is the booster engine 24. The engine 24 is supported by means of a pair of laterally spaced resilient brackets 40 carried by the cross member 7 and which support the rear end of the engine 24 by being secured to the bell housing 42 thereof. The front end of the engine is trunnioned upon an arm 43 which is supported at one end on one of the side rails 5 and is pivotally connected at 44 to a second arm 45 secured to the opposite side rail, thereby forming a toggle support for the front end of the booster engine. It will be apparent that with this construction the booster engine is disposed longitudinally rearwardly and laterally offset with respect to the main engine 15, and in reversed position with its driving end extending forwardly from the bell housing 42. The bell housing 42 of the booster engine is adapted to contain an overrunning clutch, which in turn is adapted to clutch the crankshaft of the booster engine to gearing carried within the housing 46 supported beneath the cross member 7 and secured at one end to the end flange of the bell housing. The housing 46 contains 3 gears, indicated diagrammatically at 47, 48 and 49 in Figure 3, the gear 49 being connected through the universal joint 50 to a lay shaft 52 which in turn is connected through the universal joint 53 to the rear end of the countershaft of the transmission. It will therefore be apparent that when the booster engine is started, it drives through the gears 47, 48 and 49 into the shaft 52 and this shaft in turn transmits the torque of the booster engine to the countershaft of the transmission 26. This torque is then transmitted into the main shaft of the transmission, and thence outwardly to the transfer case 32 where it is divided to go through the propeller shafts 18 and 33 to each of the driving axles.

The control system for the booster engine is so arranged as to be responsive to predetermined speed and load conditions at the main engine so that the booster engine will be cut in and deliver its torque only under predetermined conditions. This control system includes a governor responsive to the speed of the vehicle, a relay controlled by the governor and operative to actuate both the starting and the ignition circuits for the booster engine. The relay in turn is also subject to the control of a vacuum switch responsive to the vacuum in the manifold of the main engine. There is also provided an accelerator switch responsive to substantially full open throttle position at the main engine for actuating a suitable control or gas check valve to control the flow of fuel through the carburetor and into the booster engine.

This control system is described in detail in the copending application of myself, Serial No. 354,322, filed August 26, 1940, and reference should be made thereto for a more complete explanation thereof, it being obvious that the same control system which is used on a conventional two-wheel drive vehicle can be employed in the present design.

It will be apparent that the inclination of the transfer case 32 is opposite to the inclination of the housing 46, and consequently sufficient clearance is provided beneath the cross member 7 to accommodate the forwardly extending lay shaft 52 from the booster engine to the countershaft of the transmission and the propeller shafts 18 and 33 leading out from the transfer case. Preferably, the shaft 18 and the shaft 52 are of the splined telescoping type to accommodate variations in angularity.

It is also to be understood that the shaft 52 is rotating at all times that the main engine 15 is operating, being directly connected to the countershaft of the transmission. Consequently the torque of the booster engine will be applied to the shaft 52 only when the booster engine has come up to speed and the overrunning clutch in housing 42 has operated to clutch the drive shaft of the booster engine to the shaft 52. The throttle control of the booster engine is therefore preferably arranged so that as soon as the booster engine starts, it is immediately brought up to full speed and remains at full speed as long as the foot throttle at the main engine is substantially in full open position. This control is indicated generally at 56 and includes a throttle diaphragm valve 57 for operating the butterfly valve or throttle of the booster engine.

I am aware that various changes might be made in certain details of the driving arrangements and connections herein shown, and I therefore do not intend to be limited except as defined by the scope and spirit of the appended claims.

I claim:

1. The combination, with a vehicle having a front and rear driving axle, and a main power unit assembly comprising a main engine adjacent one of said axles, a transmission connected thereto, a transfer case driven from the tail shaft of said transmission, and driving means interconnecting said transfer case and each of said axles, of a secondary power unit mounted rearwardly of and laterally offset from said main engine and having driving means connected to said transmission.

2. The combination of claim 1 further characterized in that said secondary unit is connected to the countershaft of said transmission.

3. The combination of claim 1 further characterized in that said secondary unit includes means preventing transmission of torque through said driving means to said transmission except under predetermined conditions.

4. The combination of claim 1 wherein said secondary unit driving means includes laterally directed gearing, and a forwardly extending drive shaft extending beneath said transfer case to the rear end of said transmission.

5. The combination of claim 1 wherein said transfer case extends downwardly and laterally toward one side of said vehicle, and said secondary unit has laterally and downwardly extending gearing terminating rearwardly of and below the upper end of said transfer case.

6. In combination, a vehicle frame, a main engine mounted centrally at one end of said frame, a driving axle beneath said engine, a second driving axle beneath the opposite end of said vehicle, a diagonally depending transfer case arranged transversely of said frame intermediate said axles, a transmission interconnecting said engine and transfer case, drive connections between the lower end of said case and said first axle, drive connections between the top of said case and said other axle, a secondary engine mounted on said frame rearwardly of said transfer case, and means for connecting said secondary engine to said transmission.

7. The combination of claim 6 wherein said secondary engine has lateral gearing extending transversely of said frame and paralleling said transfer case, and a normally extending drive shaft connecting said gearing to the rear end of said transmission and extending beneath said transfer case.

8. The combination of claim 6 further characterized in the provision of an overruning clutch between said secondary engine and said connecting means.

9. In combination, a vehicle chassis having a front driving axle and a rear driving axle, an engine mounted in said chassis above said front driving axle, a transmission connected to said engine in longitudinal alinement therewith and having an output shaft, a transfer case supported in said chassis rearwardly of said transmission and having gearing therein driven from said output shaft, means connecting said gearing to each of said axles, an auxiliary engine supported in said chassis rearwardly of said transfer case, and means connecting said auxiliary engine to said transmission forwardly of said output shaft.

10. In combination, a vehicle chassis having a pair of longitudinally spaced driving axles, an engine mounted in said chassis over one of said axles, a transmission connected to said engine having an output shaft, a transfer case supported in said chassis rearwardly of said transmission and having gearing therein driven from said output shaft, means connecting said gearing to each of said axles, an auxiliary engine supported in said chassis one side thereof rearwardly of said transfer case, and forwardly extending means connecting said auxiliary engine to said transmission independently of said transfer case gearing.

11. In combination, a vehicle chassis having a pair of driving axles, a transfer case supported in said chassis, laterally offset drive transmitting means extending from said transfer case to each axle, a transmission for driving the gearing in said transfer case, a main engine unit coupled to said transmission, and a secondary engine unit also coupled to said transmission, said engine units being laterally and longitudinally offset and facing in opposite directions with said transmission being disposed in line between the main engine unit and said transfer case.

12. In combination, a vehicle chassis having front and rear driving axles, a transmission in said chassis intermediate said axles and having an output shaft, transfer gearing connected to said shaft, means extending from said gearing for driving each of said axles, and a pair of engine units disposed in longitudinally offset relation in said chassis beyond opposite ends of said transmission and connected to said transmission forwardly of said output shaft for driving the same.

DONALD D. ORMSBY.